United States Patent
Frankland

(10) Patent No.: US 9,894,674 B2
(45) Date of Patent: Feb. 13, 2018

(54) METHOD AND APPARATUS FOR SYSTEM LEVEL SOLUTION FOR DIFFERENT SERVICE CO-EXISTENCE

(75) Inventor: Stephen Frankland, Farnborough (GB)

(73) Assignee: QUALCOMM Incorporated, San Diego, CA (US)

( * ) Notice: Subject to any disclaimer, the term of this patent is extended or adjusted under 35 U.S.C. 154(b) by 981 days.

(21) Appl. No.: 13/022,270

(22) Filed: Feb. 7, 2011

(65) Prior Publication Data

US 2012/0201194 A1    Aug. 9, 2012

(51) Int. Cl.
     *H04L 29/06*     (2006.01)
     *H04L 29/08*     (2006.01)
     (Continued)

(52) U.S. Cl.
     CPC ....... *H04W 72/1215* (2013.01); *H04L 67/148* (2013.01); *H04L 65/1083* (2013.01);
     (Continued)

(58) Field of Classification Search
     CPC ......... H04W 36/0016; H04W 36/0022; H04W 36/14; H04W 36/18; H04W 36/20;
     (Continued)

(56) References Cited

U.S. PATENT DOCUMENTS 7,286,503 B1 * 10/2007 Clarke ............... H04B 7/18506
                                                       370/328

7,346,369 B2 * 3/2008 Fitton .................. H04W 88/06
                                                       370/338

(Continued)

FOREIGN PATENT DOCUMENTS

CN      101646245 A     2/2010
EP       1615394 A1     1/2006
(Continued)

OTHER PUBLICATIONS

3rd Generation Partnership Project; Technical Specification Group Services and System Aspects; Circuit Switched (CS) fallback in Evolved Packet System (EPS); Stage 2 (Release 10), 3GPP Standard; 3GPP TS 23.272, 3rd Generation Partnership Project (3GPP), Mobile Competence Centre ; 650, Route Des Lucioles ; F-06921 Sophia-Antipolis Cedex ; France, No. V10.1.0, Sep. 29, 2010 (Sep. 29, 2010), pp. 1-78, XP050442328, [retrieved on Sep. 29, 2010].

(Continued)

*Primary Examiner* — Parth Patel
*Assistant Examiner* — Kai Chang
(74) *Attorney, Agent, or Firm* — Harrity & Harrity, LLP

(57) ABSTRACT

An apparatus and method for implementing a system solution for co-existence between a first service and a second service including accepting a first service selection for a first wireless system on a mobile terminal; performing a data transport using the first service selection on the mobile terminal; accepting a second service selection for a second wireless system on the mobile terminal; implementing a suspension of the data transport using the first service selection on the mobile terminal; and redirecting the data transport using a different wireless system.

34 Claims, 11 Drawing Sheets

(51) Int. Cl.
*H04W 36/00* (2009.01)
*H04W 36/14* (2009.01)
*H04W 36/18* (2009.01)
*H04W 36/20* (2009.01)
*H04W 72/12* (2009.01)
*H04W 76/02* (2009.01)
*H04W 76/04* (2009.01)

(52) U.S. Cl.
CPC .... *H04W 36/0016* (2013.01); *H04W 36/0022* (2013.01); *H04W 36/14* (2013.01); *H04W 36/18* (2013.01); *H04W 36/20* (2013.01); *H04W 76/025* (2013.01); *H04W 76/048* (2013.01)

(58) Field of Classification Search
CPC .......... H04W 72/1215; H04W 76/025; H04W 76/048; H04L 65/1083; H04L 67/148
USPC .......................................... 370/331; 455/436
See application file for complete search history.

(56) References Cited

U.S. PATENT DOCUMENTS

| | | | |
|---|---|---|---|
| 8,345,607 B2* | 1/2013 | Banerjea | H04W 16/14 370/329 |
| 9,351,193 B2* | 5/2016 | Raleigh | H04M 15/80 |
| 2003/0139184 A1* | 7/2003 | Singh et al. | 455/436 |
| 2005/0141477 A1* | 6/2005 | Tomita et al. | 370/349 |
| 2007/0123258 A1* | 5/2007 | Sawyer | 455/436 |
| 2008/0108366 A1* | 5/2008 | Hu | H04W 72/1278 455/452.1 |
| 2008/0151845 A1* | 6/2008 | Jaakkola et al. | 370/338 |
| 2009/0040937 A1* | 2/2009 | Xhafa et al. | 370/252 |
| 2009/0080409 A1* | 3/2009 | Jayapalan et al. | 370/352 |
| 2009/0129342 A1* | 5/2009 | Hwang et al. | 370/331 |
| 2009/0175241 A1* | 7/2009 | Ohta et al. | 370/331 |
| 2009/0268690 A1* | 10/2009 | Sebire | 370/332 |
| 2009/0325580 A1* | 12/2009 | Kazmi et al. | 455/436 |
| 2010/0002650 A1* | 1/2010 | Ahluwalia | 370/331 |
| 2010/0046494 A1* | 2/2010 | Palanki | H04W 56/0015 370/344 |
| 2010/0128694 A1* | 5/2010 | Choi-Grogan | H04W 36/0027 370/331 |
| 2010/0135206 A1* | 6/2010 | Cherian | H04W 36/0066 370/328 |
| 2010/0142488 A1* | 6/2010 | Zhang et al. | 370/332 |
| 2010/0208699 A1* | 8/2010 | Lee et al. | 370/331 |
| 2010/0287599 A1* | 11/2010 | He et al. | 726/1 |
| 2011/0268084 A1* | 11/2011 | Tanabe et al. | 370/331 |
| 2011/0299429 A1* | 12/2011 | Tiwari | H04W 36/0022 370/259 |
| 2012/0044861 A1* | 2/2012 | Lu | H04W 76/026 370/328 |
| 2012/0069817 A1* | 3/2012 | Ling et al. | 370/331 |
| 2012/0120789 A1* | 5/2012 | Ramachandran et al. | 370/220 |
| 2012/0213150 A1* | 8/2012 | Oguz et al. | 370/328 |

FOREIGN PATENT DOCUMENTS

| | | |
|---|---|---|
| EP | 2247039 A1 | 11/2010 |
| WO | WO-2010030938 A1 | 3/2010 |
| WO | 2010146238 A1 | 12/2010 |

OTHER PUBLICATIONS

International Search Report and Written Opinion—PCT/US2012/024179—ISA/EPO—May 24, 2012.
Lucent Technologies: "UE security capability in INTER_RAT handover", 3GPP TSG-RAN WG2#43, R2-41891, Aug. 20, 2004, pp. 1-6.

* cited by examiner

METHOD AND APPARATUS FOR SYSTEM LEVEL SOLUTION FOR DIFFERENT SERVICE CO-EXISTENCE

TECHNICAL FIELD

This disclosure relates generally to apparatus and methods for wireless communications. More particularly, the disclosure relates to allow coexistence between two wireless communication systems.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, $3^{rd}$ Generation Partnership Project (3GPP) Long Term Evolution (LTE) systems, time division synchronous code division multiple access (TD-SCDMA) systems and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system may support time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Disclosed is an apparatus and method for co-existence between a first service and a second service. According to one aspect, a method for implementing a system solution for co-existence between a first service and a second service including accepting a first service selection for a first wireless system on a mobile terminal; performing a data transport using the first service selection on the mobile terminal; accepting a second service selection for a second wireless system on the mobile terminal; implementing a suspension of the data transport using the first service selection on the mobile terminal; and redirecting the data transport using a different wireless system.

According to another aspect, an apparatus comprising a processor and a memory, the memory containing program code executable by the processor for performing the following: accepting a first service selection for a first wireless system on a mobile terminal; performing a data transport using the first service selection on the mobile terminal; accepting a second service selection for a second wireless system on the mobile terminal; implementing a suspension of the data transport using the first service selection on the mobile terminal; and redirecting the data transport using a different wireless system.

According to another aspect, an apparatus for implementing a system solution for co-existence between a first service and a second service including means for accepting a first service selection for a first wireless system on a mobile terminal; means for performing a data transport using the first service selection on the mobile terminal; means for accepting a second service selection for a second wireless system on the mobile terminal; means for implementing a suspension of the data transport using the first service selection on the mobile terminal; and means for redirecting the data transport using a different wireless system.

According to another aspect, a computer-readable medium storing a computer program, wherein execution of the computer program is for accepting a first service selection for a first wireless system on a mobile terminal; performing a data transport using the first service selection on the mobile terminal; accepting a second service selection for a second wireless system on the mobile terminal; implementing a suspension of the data transport using the first service selection on the mobile terminal; and redirecting the data transport using a different wireless system.

Advantages of the present disclosure may include no requirement of hardware filter modifications, and thus, preserving the receive sensitivity of a MediaFLO receiver. Another potential advantage may include preserving an uplink data connection by moving data transport from an LTE uplink physical interface to a separate uplink physical interface.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
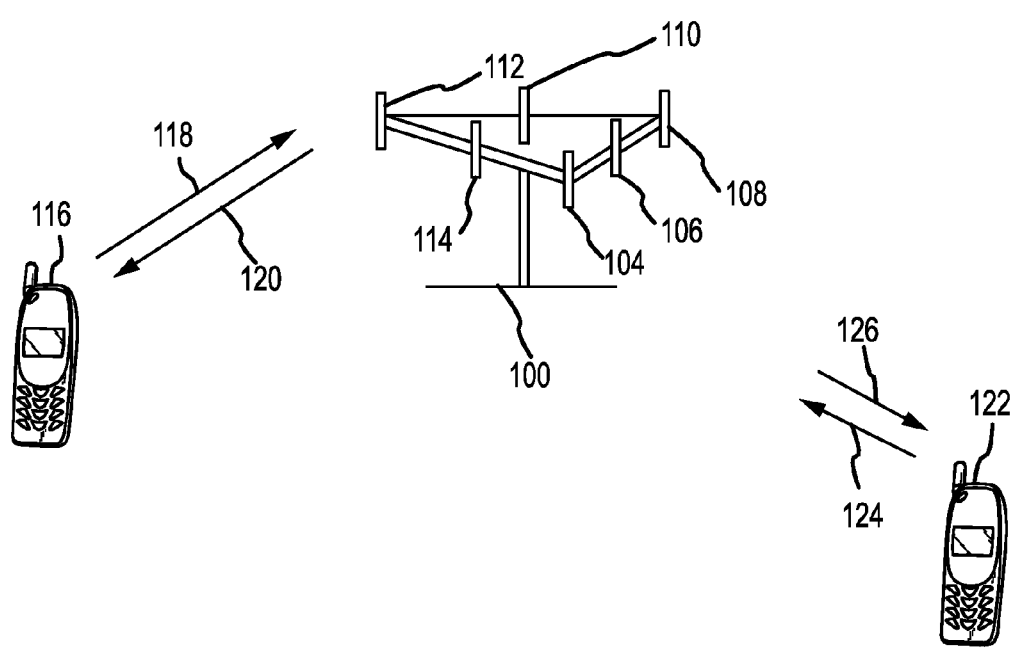
FIG. 1 illustrates an example of a multiple access wireless communication system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Time Division Synchronous Code Division Multiple Access (TD-SCDMA) (a.k.a. Low Chip Rate (LCR)). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization, is a transmission technique. SC-FDMA has similar performance and essentially the same overall complexity as those of an OFDMA system. An SC-FDMA signal may have a lower peak-to-average power ratio (PAPR) because of its inherent single carrier structure. SC-FDMA may be utilized in the uplink communications where lower PAPR benefits the mobile terminal in terms of transmit power efficiency.

FIG. 1 illustrates an example of a multiple access wireless communication system. FIG. 1 illustrates an access point 100 (AP) that includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In a FDD system, communication links 118, 120, 124 and 126 may each use different frequency for communication. For example, forward link 120 may use a different frequency than that used by reverse link 118.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, eNodeB or some other terminology. An access terminal may also be called an access terminal, user equipment (UE), a wireless communication device, terminal, access terminal or some other terminology.

Figure 2:
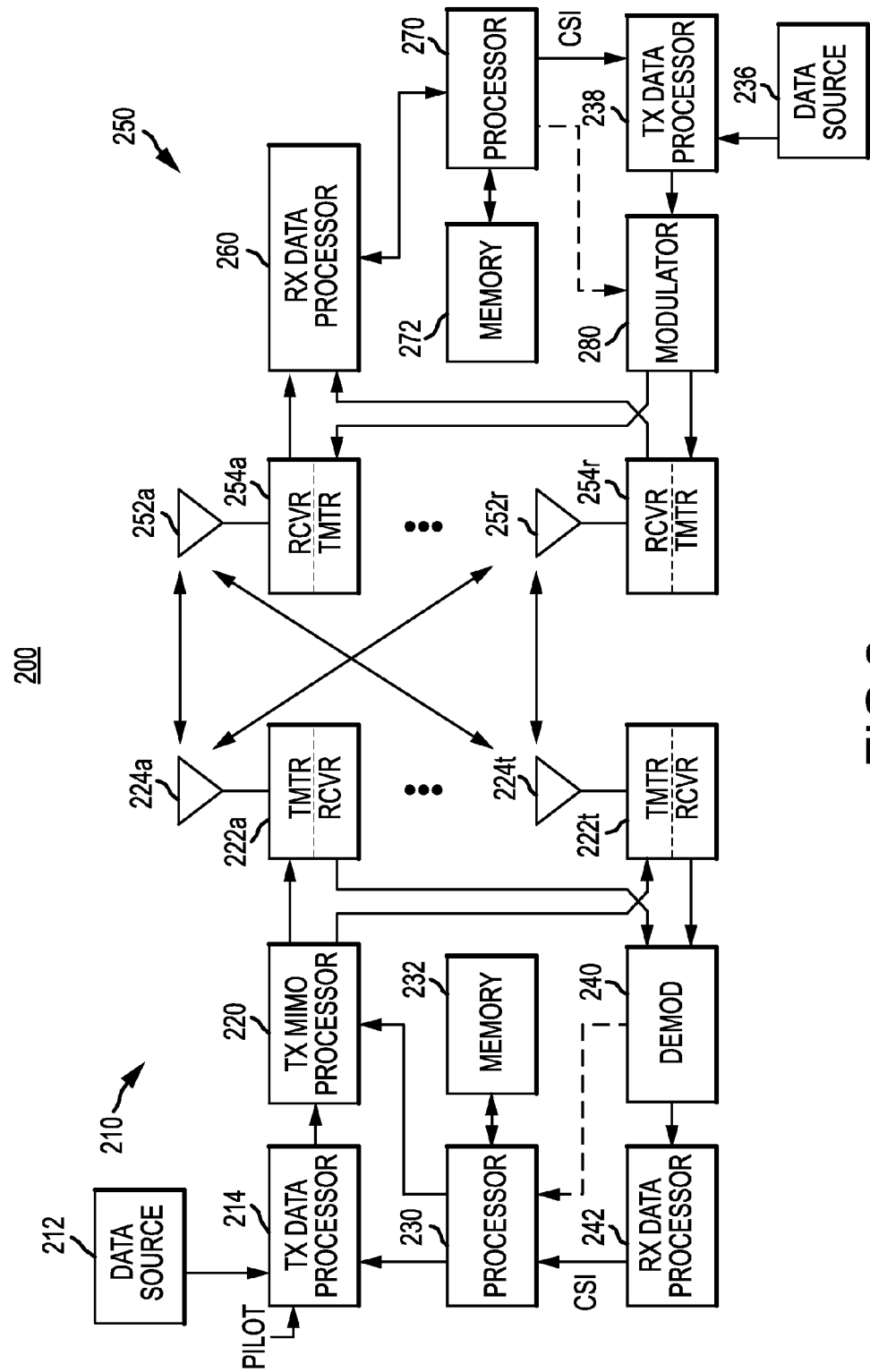
FIG. 2 illustrates an example block diagram of a transmitter system (also known as the access point) and a receiver system (also known as an access terminal) in a multiple input multiple output (MIMO) system.

FIG. 2 illustrates an example block diagram of a transmitter system 210 (also known as the access point) and a receiver system 250 (also known as an access terminal) in a multiple input multiple output (MIMO) system 200. At the transmitter system 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may include various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights then processes the extracted message.

In an aspect, logical channels are classified into Control Channels and Traffic Channels. Logical Control Channels may include a Broadcast Control Channel (BCCH) which is a downlink channel for broadcasting system control information, a Paging Control Channel (PCCH) which is a downlink channel that transfers paging information, a Multicast Control Channel (MCCH) which is a point-to-multi-point downlink channel used for transmitting Multimedia Broadcast and Multicast Service (MBMS) scheduling and control information for one or several MTCHs.

Generally, after establishing an RRC connection, MCCH this is only used by UEs that receive MBMS (Note: old MCCH+MSCH). A Dedicated Control Channel (DCCH) is a point-to-point bi-directional channel that transmits dedicated control information and used by UEs having an RRC connection. In aspect, Logical Traffic Channels may include a Dedicated Traffic Channel (DTCH) which is a point-to-point bi-directional channel, dedicated to one UE, for the transfer of user information. Also, a Multicast Traffic Channel (MTCH) may be used for a point-to-multipoint downlink channel for transmitting traffic data.

In one aspect, Transport Channels are classified into downlink (DL) and uplink (UL) channels. DL Transport Channels may include a Broadcast Channel (BCH), Downlink Shared Data Channel (DL-SDCH) and a Paging Channel (PCH), the PCH for support of UE power saving (DRX cycle is indicated by the network to the UE), broadcasted over entire cell and mapped to PHY resources which can be used for other control/traffic channels. The UL Transport Channels may include a Random Access Channel (RACH), a Request Channel (REQCH), a Uplink Shared Data Channel (UL-SDCH) and plurality of PHY channels. The PHY channels may include a set of DL channels and UL channels.

In one aspect, the DL PHY channels may include one or more of the following:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)

In one aspect, the UL PHY Channels may include one or more of the following:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)

In one aspect, a channel structure is provided that preserves low peak to average power ratio (PAPR) (i.e., at any given time, the channel is contiguous or uniformly spaced in frequency) properties of a single carrier waveform.

For the purposes of the present disclosure, one or more of the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel CoMP coordinated multi point
CP Cyclic Prefix
CRC Cyclic Redundancy Check
CTCH Common Traffic CHannel
DCCH Dedicated Control CHannel
DCH Dedicated CHannel
DCI Downlink Control Information
DL DownLink
DL-SCH Downlink shared channel
DSCH Downlink Shared CHannel
DTCH Dedicated Traffic Channel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
LTE Long Term Evolution
LTE-A LTE-Advanced or Long Term Evolution—Advanced
MAC Medium Access Control
MBMS Multimedia Broadcast Multicast Service
MBSFN Multicast Broadcast Single Frequency Network
MCE MBMS coordinating entity
MCCH MBMS point-to-multipoint Control CHannel
MCH Multicast Channel
MRW Move Receiving Window
MSB Most Significant Bit
MSCH MBMS point-to-multipoint Scheduling Channel or MBMS control channel
MTCH MBMS point-to-multipoint Traffic CHannel
PBCH Physical Broadcast CHannel
PCCH Paging Control CHannel
PCH Paging CHannel
PCFICH Physical Control Format Indicator Channel
PDCCH Physical Downlink Control Channel
PDSCH Physical Downlink Shared Channel
PDU Protocol Data Unit
PHICH Physical Hybrid ARQ Indicator CHannel
PHY PHYsical layer
PhyCH Physical Channels
PMCH Physical Multicast Channel
PRACH Physical Random Access Channel
PUSCH Physical Uplink Shared Channel
PUCCH Physical Uplink Control Channel
RACH Random Access CHannel
RLC Radio Link Control
RRC Radio Resource Control
RNTI radio network temporary identifier
SAP Service Access Point
SDU Service Data Unit
SHCCH SHared channel Control CHannel
SN Sequence Number
SNR signal-to-noise ratio
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network In one aspect, LTE-Advanced (LTE-A) is a next generation wireless technology evolution in the UMTS protocol family. Desired goals for LTE-A systems include enhanced data rates, up to 1 Gb/s on the downlink, for example. In addition, deployment of LTE-A wireless systems must be backward-compatible with LTE systems to preserve the financial investments made in the preceding LTE infrastructure. Furthermore, another goal for LTE-A systems is improved spectral efficiency, that is, a higher data throughput per unit bandwidth, expressed in bits per second per Hertz (bps/Hz). Improved spectral efficiency is vital to the growth of the wireless communication industry since the available spectral resources for wireless transmission are severely limited and tightly regulated worldwide.

In the present disclosure the first deployment of LTE will be referred to as LTE Release 8 (Rel-8). A modified LTE version is known as LTE Release 9 (Rel-9). A subsequent upgrade of LTE Release 8/9 is referred to, in the present disclosure, as either LTE-Advanced (LTE-A) or LTE Rel-10+. In the present disclosure, the "10+" reference denotes a "Release 10" version or a later version. However, any reference to a particular LTE version or to the term "LTE" is stated only as an example and should not be construed as exclusive to a particular LTE version as other LTE versions may be applicable. One skilled in the art would understand that the scope and spirit of the present disclosure is applicable to future upgrades of LTE with the applicable characteristics described herein, regardless of the name assigned to any future upgrade versions.

In one aspect, a proposed feature in LTE-A is known as carrier extension. In one example, individual component carriers may be extended to provide a wider bandwidth, up to, for example, 100 MHz.

In one aspect, user equipment (UE) compatible with LTE-A may have a different allocation of system bandwidth than UEs compatible only with, for example, LTE Rel-8 due to the usage of carrier extension. Resource assignments and other control data for the LTE or LTE-A downlinks are carried in a message known as the Downlink Control Information (DCI).

Long Term Evolution (LTE) is a next-generation evolution of the Universal Mobile Telecommunications System (UMTS), a worldwide protocol family for wireless communications. LTE provides several new technological features compared to previous wireless technologies including OFDM multicarrier transmission, provisions for multiple antennas for both transmit and receive, and an Internet protocol (IP) packet switching network infrastructure. In particular, OFDM relies on a two-dimensional array of orthogonal time and frequency resources which may be aggregated in many flexible ways to provide a wide variety of user services.

In one aspect, a mobile station or mobile terminal that a user carries for wireless communications is known as user equipment (UE). In general, the UE connects to other users either within the wireless network or the general communications infrastructure such as the public switched telephony network (PSTN), Internet, private networks, wide area networks (WANs), etc. via a wireless bidirectional link to an evolved NodeB (eNodeB), also known generically as a base station, which represents the wireless network access node for the UE. Other wireless network elements separate from the access nodes (e.g. eNodeBs) are considered part of the core network (CN). The eNodeB is connected to other network elements such as the serving gateway (S-GW) and the Mobility Management Entity (MME). In one aspect, the S-GW serves as a mobility anchor for data bearers when the UE moves between different eNodeBs. In another aspect, the MME serves as a control entity for managing the signaling between the UE and the core network (CN). The S-GW interfaces with the packet data network gateway (P-GW), which functions as a LTE portal to the global Internet, for example. The P-GW also allocates IP addresses for the UE and enforces quality of service (QoS) based on policy rules.

In one aspect, the downlink resources in LTE are partitioned into smaller elemental time and frequency resources. For example, in the time dimension, a radio frame has 10 ms duration and is divided into ten subframes, each of 1 ms duration. Furthermore, each subframe is divided into two 0.5 ms slots. In the case of a normal cyclic prefix length, each slot includes seven OFDM symbols. In the frequency dimension, a Resource Block (RB) is a group of 12 subcarriers each with a subcarrier bandwidth of 15 kHz. A subcarrier is also denoted as a tone, for example. One Resource Element (RE) is the smallest resource unit in LTE which consists of one subcarrier and one OFDM symbol.

In another aspect, certain Resource Blocks are dedicated for special signals such as synchronization signals, reference signals, control signals and broadcast system information. Three essential synchronization steps in LTE are necessary: symbol timing acquisition, carrier frequency synchronization, and sampling clock synchronization. In one example, LTE relies on two special synchronization signals for each cell: the Primary Synchronization Signal (PSS) and the Secondary Synchronization Signal (SSS) which are used for time and frequency synchronization and for broadcasting of certain system parameters such as cell identification, cyclic prefix length, duplex method, etc. In general, the PSS is detected by the UE first, followed by SSS detection.

In one aspect, the PSS is based on a Zadoff-Chu sequence, a constant amplitude chirp-like digital sequence. In general, the PSS is detected non-coherently (i.e., detection without phase information) by the UE since there is assumed to be no a priori channel information available by the UE. In another aspect, the SSS is based on a maximal length sequence (also known as M-sequence). Since the detection of the SSS is performed after the detection of the PSS, if channel state information (CSI) is available to the UE after PSS detection, then coherent detection (i.e., detection with phase information) of the SSS may be available. In certain scenarios, however, non-coherent detection of the SSS may be required, for example, in the case of coherent interference from neighboring eNodeBs.

In another aspect, after PSS and SSS detection has been accomplished, for the case of new cell identification, the UE acquires and tracks certain Reference Signals (RS) from the LTE downlink. The LTE downlink, in one example, may contain three unique RS types as follows:

Cell-specific RSs, broadcast to all UEs within a cell
UE-specific RSs, intended only for certain UEs
MBSFN-specific RSs, intended only for Multimedia Broadcast Single Frequency Network (MBSFN) operation In one aspect, different wireless systems with overlapping coverage area and a shared radio band may interfere with each other. For example, interference may be due to adjacent channel interference. An uplink channel of a first wireless system may be adjacent to channels of a second wireless system. For example, the first wireless system may be based on LTE and the second wireless system may be based on MediaFLO. In one aspect, MediaFLO is a forward link only (FLO) wireless broadcast system optimized for reception by small wireless devices. In one example, LTE uplink channel 54 is adjacent to MediaFLO receive channel 55 and channel 56. In one aspect, adjacent channel interference may cause a co-existence problem for different wireless systems. In one example, the shared radio band is around 700 MHz.

Figure 3:
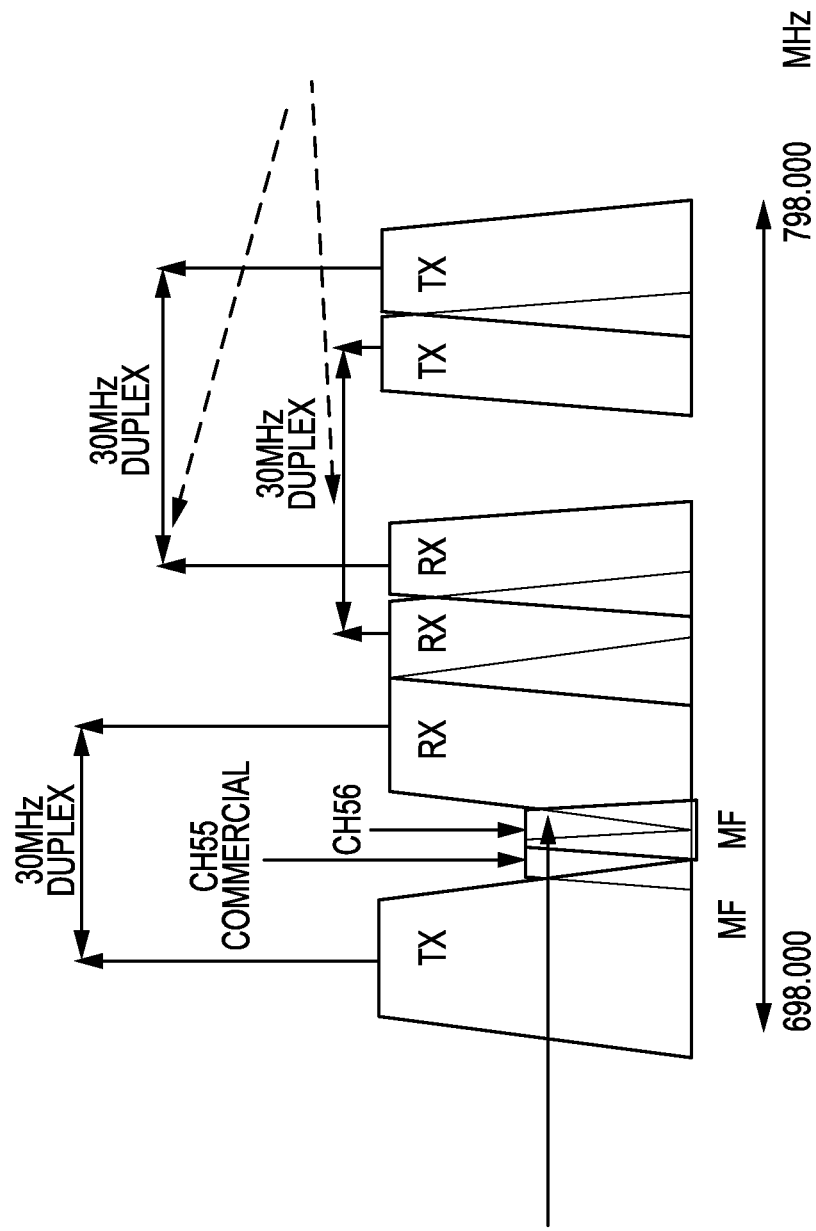
FIG. 3 illustrates an example of a spectrum plot around 700 MHz.

FIG. 3 illustrates an example of a spectrum plot around 700 MHz. Shown are various communication services including MediaFLO around 700 MHz. In particular, MediaFLO receive channels 55 and 56 are shown adjacent to an LTE transmit channel.

Figure 4A:
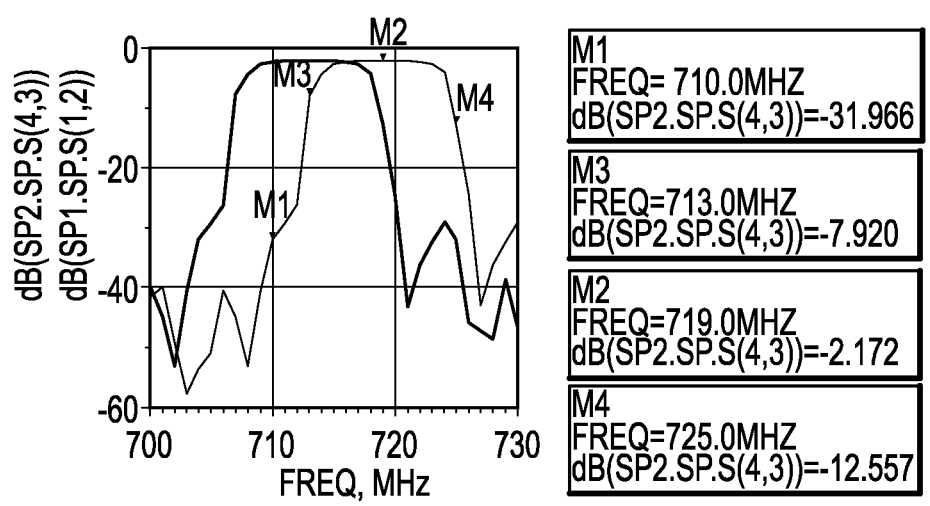
FIG. 4 illustrates examples of filter overlay plots for LTE channel 54 and MediaFLO channels 55/56.
Figure 4B:
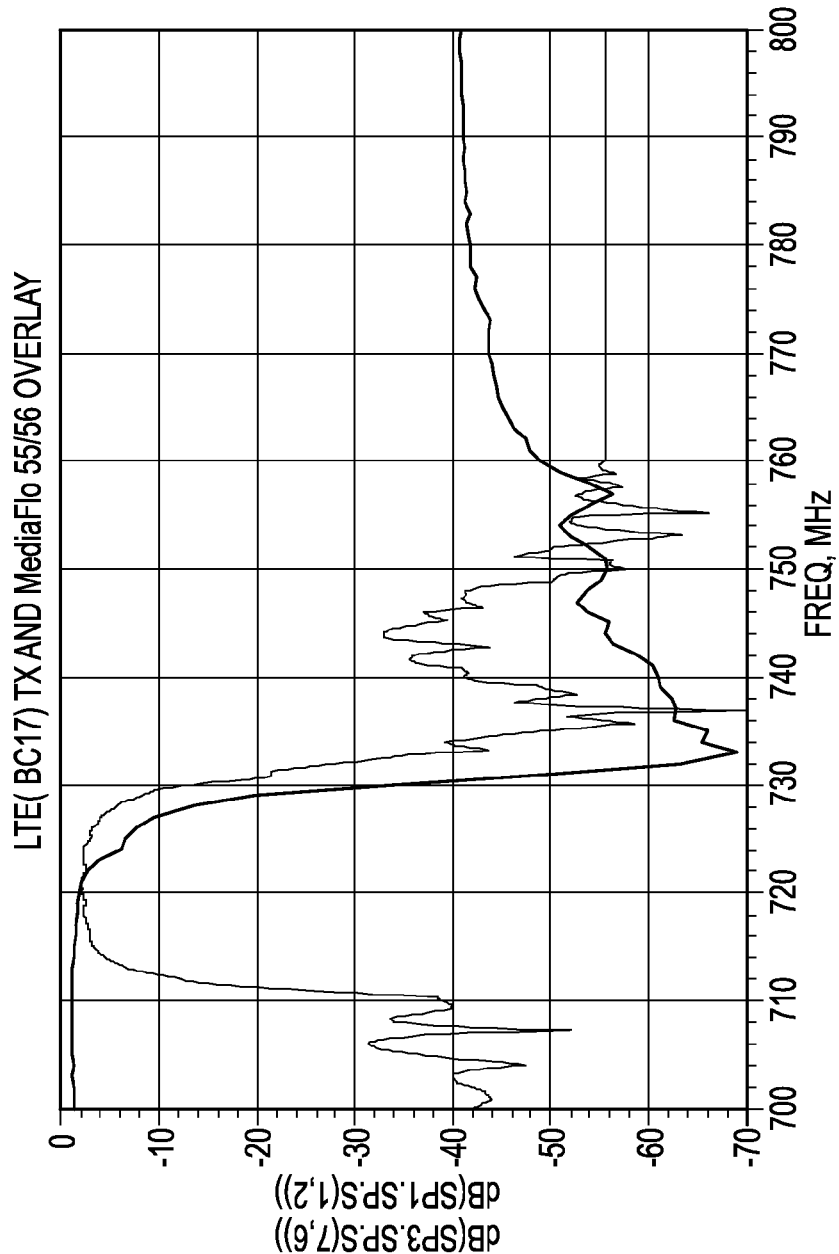

FIG. 4 illustrates examples of filter overlay plots for LTE channel 54 and MediaFLO channels 55/56. A filter overlay plot displays amplitude transfer functions in the frequency domain. In one example, a filter for LTE channel 54 is implemented as a duplexer. In another example, a filter for MediaFLO channels 55/56 is implemented as a single channel filter.

Figure 5A:
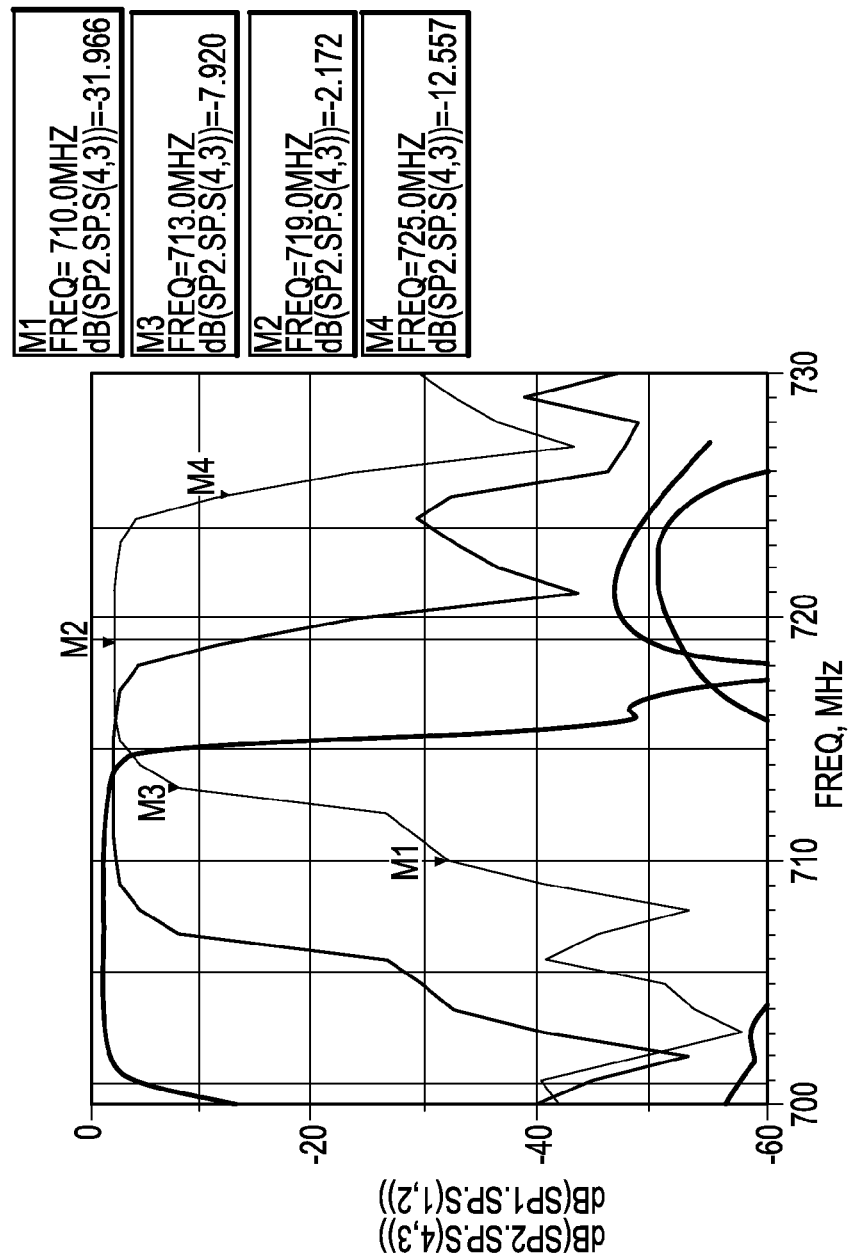
FIG. 5 illustrates examples of other filter overlap plots for LTE channel 54 and MediaFLO channels 55/56.
Figure 5B:
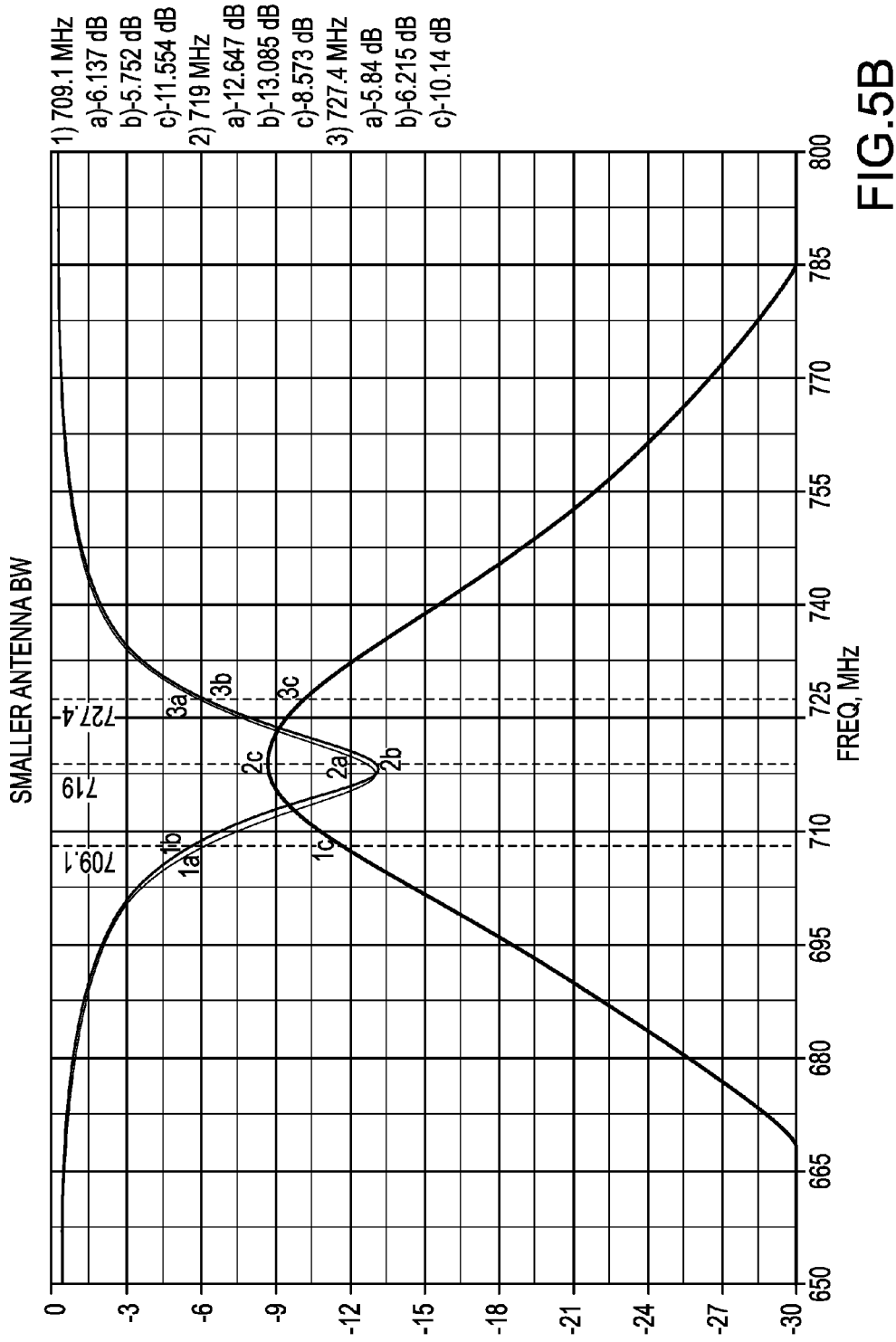

FIG. 5 illustrates examples of other filter overlap plots for LTE channel 54 and MediaFLO channels 55/56. In one example, a tuned antenna is implemented as part of a filter.

Table 1 lists examples of available Evolved UMTS Terrestrial Radio Access (E-UTRA) frequency bands. In one aspect, Table 1 shows uplink operating band, downlink operating band and duplex mode (frequency division duplex (FDD) or time division duplex (TDD)).

TABLE 1

| E-UTRA Operating Band | Uplink (UL) operating band BS receive UE transmit FUL_low-FUL_high | Downlink (DL) operating band BS transmit UE receive FDL_low-FDL_high | Duplex Mode |
|---|---|---|---|
| 1 | 1920 MHz-1980 MHz | 2110 MHz-2170 MHz | FDD |
| 2 | 1850 MHz-1910 MHz | 1930 MHz-1990 MHz | FDD |
| 3 | 1710 MHz-1785 MHz | 1805 MHz-1880 MHz | FDD |
| 4 | 1710 MHz-1755 MHz | 2110 MHz-2155 MHz | FDD |
| 5 | 824 MHz-849 MHz | 869 MHz-894 MHz | FDD |
| 6 | 830 MHz-840 MHz | 875 MHz-885 MHz | FDD |
| 7 | 2500 MHz-2570 MHz | 2620 MHz-2690 MHz | FDD |
| 8 | 880 MHz-915 MHz | 925 MHz-960 MHz | FDD |
| 9 | 1749.9 MHz-1784.9 MHz | 1844.9 MHz-1879.9 MHz | FDD |
| 10 | 1710 MHz-1770 MHz | 2110 MHz-2170 MHz | FDD |
| 11 | 1427.9 MHz-1452.9 MHz | 1475.9 MHz-1500.9 MHz | FDD |
| 12 | 698 MHz-716 MHz | 728 MHz-746 MHz | FDD |
| 13 | 777 MHz-787 MHz | 746 MHz-756 MHz | FDD |
| 14 | 788 MHz-798 MHz | 758 MHz-768 MHz | FDD |
| ... | | | |
| 17 | 704 MHz-716 MHz | 734 MHz-746 MHz | FDD |
| ... | | | |
| 33 | 1900 MHz-1920 MHz | 1900 MHz-1920 MHz | TDD |
| 34 | 2010 MHz-2025 MHz | 2010 MHz-2025 MHz | TDD |
| 35 | 1850 MHz-1910 MHz | 1850 MHz-1910 MHz | TDD |
| 36 | 1930 MHz-1990 MHz | 1930 MHz-1990 MHz | TDD |
| 37 | 1910 MHz-1930 MHz | 1910 MHz-1930 MHz | TDD |
| 38 | 2570 MHz-2620 MHz | 2570 MHz-2620 MHz | TDD |
| 39 | 1880 MHz-1920 MHz | 1880 MHz-1920 MHz | TDD |
| 40 | 2300 MHz-2400 MHz | 2300 MHz-2400 MHz | TDD |

The present disclosure discloses an example of a system solution for MediaFLO and LTE co-existence. In one aspect, when a mobile user selects MediaFLO service, a mobile terminal for the mobile user suspends a LTE uplink physical interface. In one example, the suspension may be performed by setting an identifier for the mobile terminal. In one example, the suspension may be performed by setting a Class Mark identifier for the mobile terminal. The Class Mark identifier is a set of information which describes the capabilities of the mobile terminal, for example, mode capabilities, duplexing capabilities, encryption capabilities, frequency band capabilities, etc. The usage of the Class Mark identifier tells the wireless network not to use the LTE network. A mobile terminal scheduler, for example based on a software implementation, may be executed to initiate the setting of the Class Mark identifier. In one example, the setting of the Class Mark identifier is initiated prior to the commencement of MediaFLO operation. In one aspect, data transport via the LTE uplink physical interface prior to its suspension may be transported by a separate uplink physical interface. The separate uplink physical interface may be another wireless system, such as, 1x-EVDO, UMTS, or GSM. In another aspect, after completion of the LTE data transport, the setting of the Class Mark identifier is cleared by the mobile terminal scheduler.

In another aspect, the disclosed system solution may be applied to different wireless radio bands, other than the 700 MHz shared radio band. Also, the data transport may be performed on other physical interfaces besides an uplink physical interface. In addition, the disclosed system solution may be applied to femto-cell architectures as well, where femto-cells are radio cells which cover a very small area such as a home or business. One skilled in the art would understand that the disclosed examples are not exclusive to the spirit and scope of the present disclosure.

Figure 6:
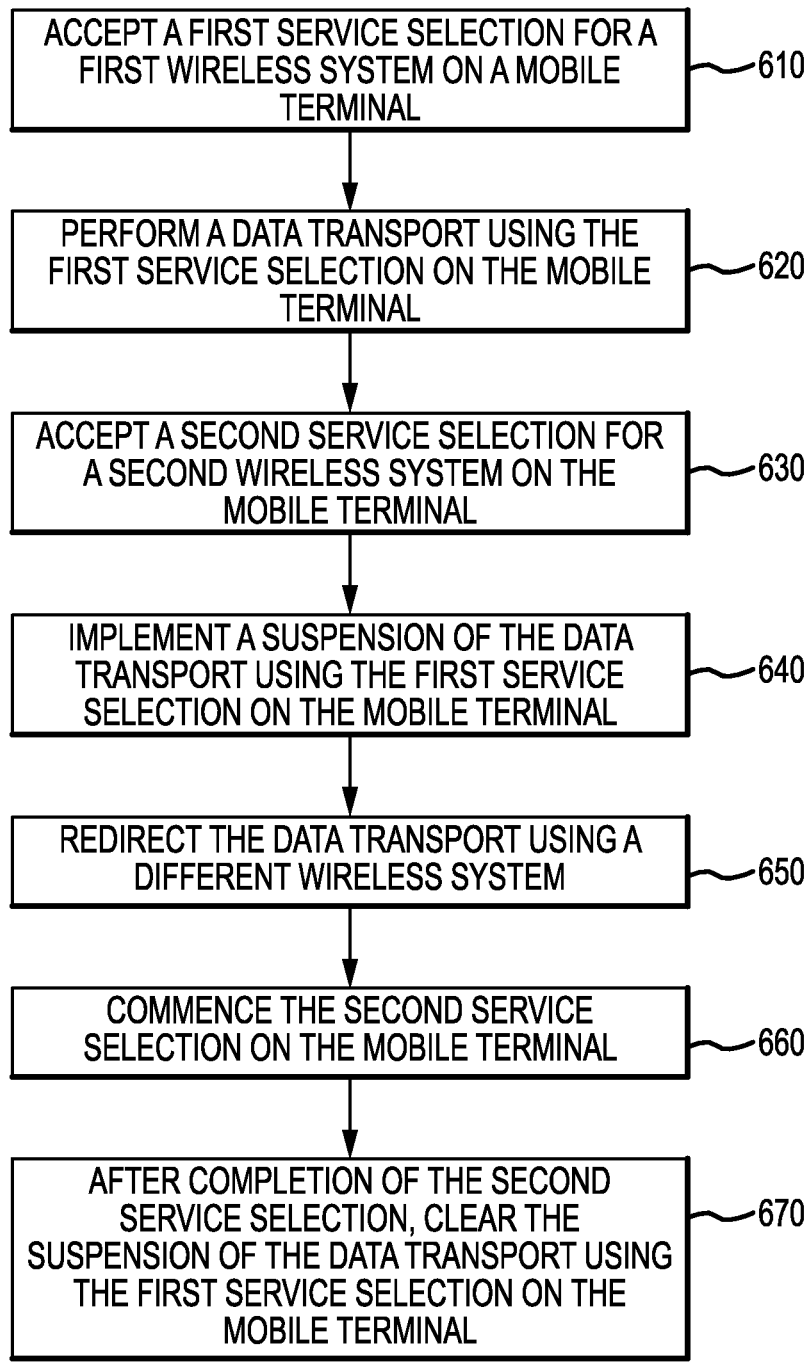
FIG. 6 illustrates an example flow diagram for implementing a system solution for co-existence between a first service and a second service.

FIG. 6 illustrates an example flow diagram for implementing a system solution for co-existence between a first service and a second service. In block 610, accept a first service selection for a first wireless system on a mobile terminal. In one example, the first wireless system is based on a LTE system. In block 620, perform a data transport using the first service selection on the mobile terminal. In block 630, accept a second service selection for a second wireless system on the mobile terminal. In one example, the second wireless system is based on a forward link only wireless broadcast system, for example, a MediaFLO system. In block 640, implement a suspension of the data transport using the first service selection on the mobile terminal. In one example, the suspension is implemented by using an identifier for the mobile terminal. In one example, the suspension is implemented by using a Class Mark identifier for the mobile terminal. In another example, the suspension is implemented by a mobile terminal scheduler. In block 650, redirect the data transport using a different wireless system. In one example, the different wireless system may be based on 1x-EVDO, UMTS, GSM, etc. In block 660, commence the second service selection on the mobile terminal. In one example, the second service selection is based on a forward link only wireless broadcast system, for example, a MediaFLO system. In block 670, after completion of the second service selection, clear the suspension of the data transport using the first service selection on the mobile terminal. In one example, the clearing of the suspension is performed by clearing the Class Mark identifier for the mobile terminal. In another example, the suspension is cleared by the mobile terminal scheduler.

Figure 7:
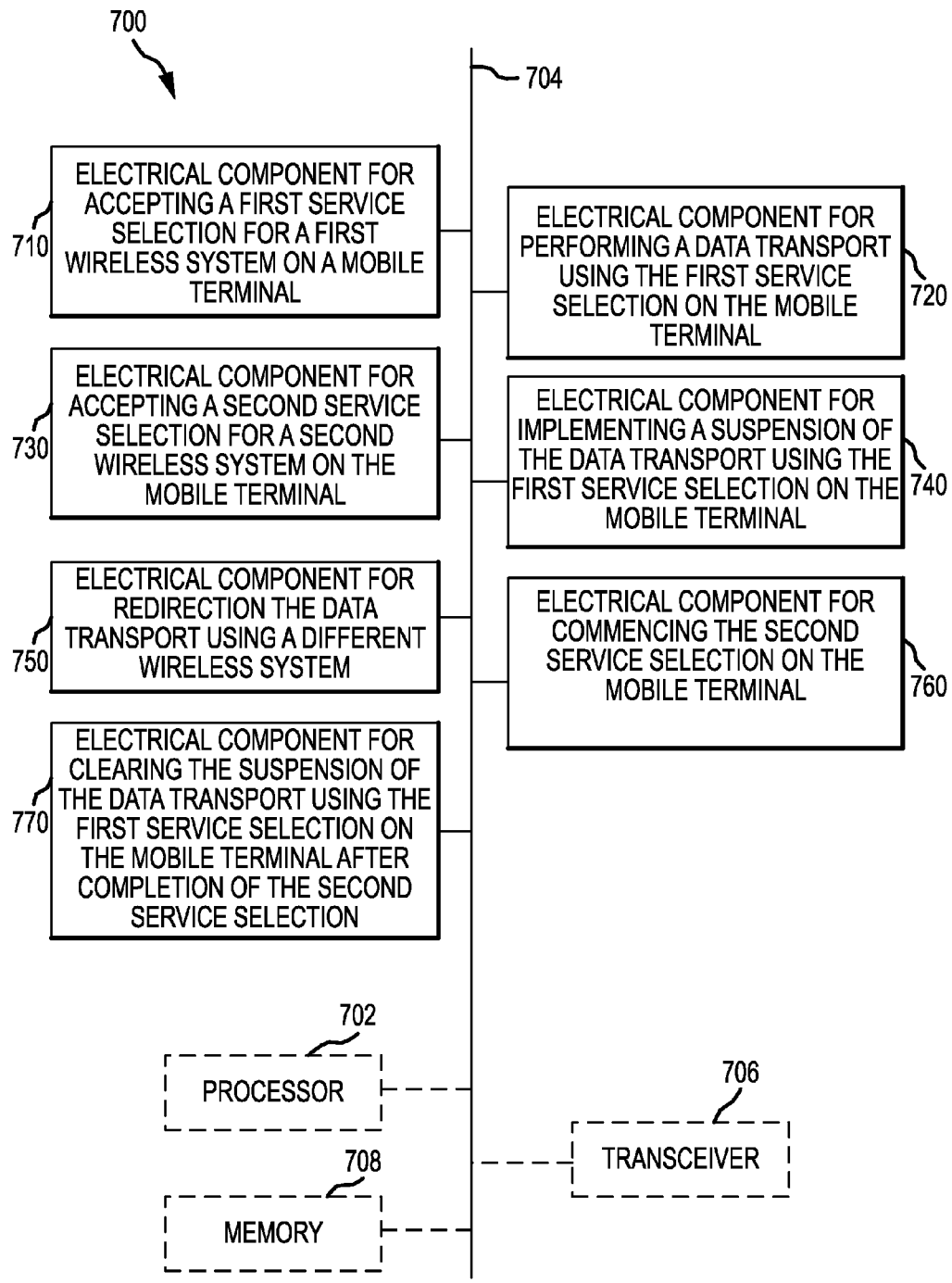
FIG. 7 illustrates an example of a first device for implementing a system solution for co-existence between a first service and a second service.

FIG. 7 illustrates an example of a first device 700 for implementing a system solution for co-existence between a first service and a second service. The device 700 may be configured as a communication device or as a processor or similar device for use within the communication device. As depicted, device 700 may include functional blocks that can represent functions implemented by a processor, software, hardware or combination thereof (e.g., firmware).

As illustrated, device 700 may include an electrical component 710 for accepting a first service selection for a first wireless system on a mobile terminal. The device 700 may include an electrical component 720 for performing a data transport using the first service selection on the mobile terminal. The device 700 may include an electrical component 730 for accepting a second service selection for a second wireless system on the mobile terminal. The device 700 may include an electrical component 740 for implementing a suspension of the data transport using the first service selection on the mobile terminal. The device 700 may include an electrical component 750 for redirecting the data transport using a different wireless system. The device 700 may include an electrical component 760 for commencing the second service selection on the mobile terminal. The device 700 may include an electrical component 770 for clearing the suspension of the data transport using the first service selection on the mobile terminal after completion of the second service selection.

Device 700 may optionally include a processor module 702 having at least one processor. In one aspect, device 700 may be configured as a communication network entity, rather than as a processor. Processor 702, in such case, may be in operative communication with electrical components 710-770 via a bus 704 or a similar communication coupling. Processor 702 may effect initiation and scheduling of the processes or functions performed by electrical components 710-770.

In related aspects, device 700 may include a transceiver module 706. A stand-alone receiver and/or stand-alone transmitter may be used in lieu of or in conjunction with transceiver module 706. In further related aspects, device 700 may optionally include a module for storing information, such as, for example, a memory module 708. The memory module 708 may include a computer readable medium and may be operatively coupled to the other components of device 700 via a bus 704 or the like. The memory module 708 may be adapted to store computer readable codes, instructions and/or data for effecting the processes and behavior of electrical components 710-770, and sub-components thereof, or processor 702, or the methods disclosed herein. Memory module 708 may retain codes/instructions for executing functions associated with electrical components 710-770. While shown as being external to memory module 708, it is to be understood that electrical components 710-770 may exist within memory module 708.

One skilled in the art would understand that the steps disclosed in the example flow diagram in FIG. 6 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art. In one aspect, the computer-readable medium includes non-transitory computer-readable medium.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 8:
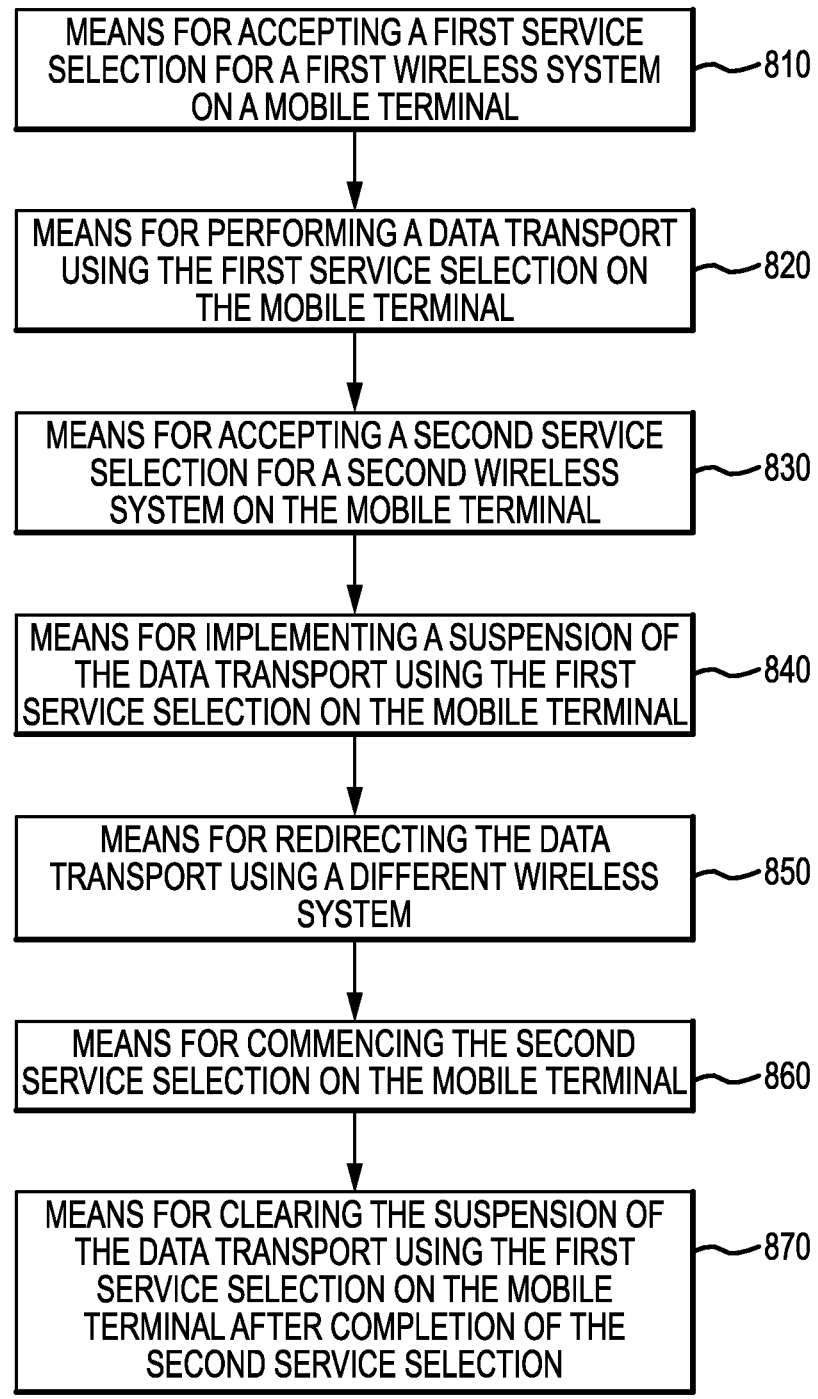
FIG. 8 illustrates an example of a second device suitable for implementing a system solution for co-existence between a first service and a second service.

FIG. 8 illustrates an example of a second device 800 suitable for implementing a system solution for co-existence between a first service and a second service. In one aspect, the device 800 is implemented by at least one processor comprising one or more modules configured to provide different aspects of implementing a system solution for co-existence between a first service and a second service as described herein in blocks 810, 820, 830, 840, 850, 860 and 870. For example, each module includes hardware, firmware, software, or any combination thereof. In one aspect, the device 800 is also implemented by at least one memory in communication with the at least one processor.

Figure 9:
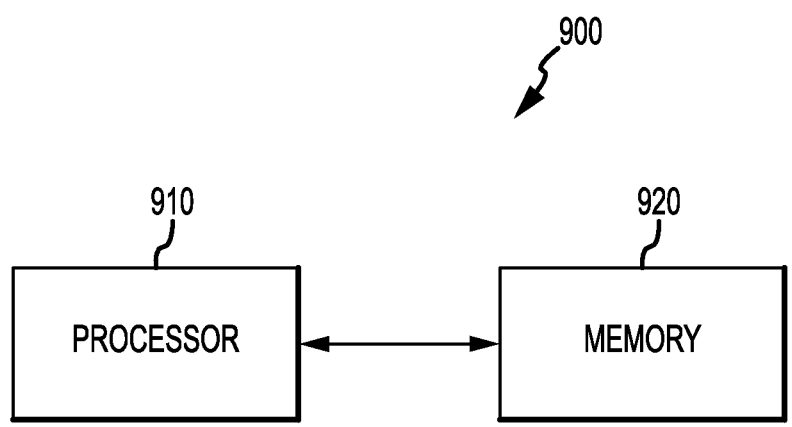
FIG. 9 illustrates an example of a device comprising a processor in communication with a memory for executing the processes of implementing a system solution for co-existence between a first service and a second service.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 9 illustrates an example of a device 900 comprising a processor 910 in communication with a memory 920 for executing the processes of implementing a system solution for co-existence between a first service and a second service. In one example, the device 900 is used to implement the algorithm illustrated in FIG. 6. In one aspect, the memory 920 is located within the processor 910. In another aspect, the memory 920 is external to the processor 910. In one aspect, the processor includes circuitry for implementing or performing the various flow diagrams, logical blocks and/or modules described herein.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for implementing a system solution for coexistence between a first service and a second service comprising:
   accepting a first service selection for a first wireless cellular system on a mobile terminal;
   performing a data transport using the first service selection on the mobile terminal;
   accepting a second service selection for a second wireless cellular system on the mobile terminal, wherein a channel of the second wireless cellular system used by the second service interferes with a channel of the first wireless cellular system used by the first service;
   implementing a suspension of the data transport using the first service selection on the mobile terminal based on accepting the second service selection,
      the suspension of the data transport being implemented by the mobile terminal setting an identifier for the mobile terminal that indicates not to use the first wireless cellular system;
   causing the data transport to be redirected using a third wireless cellular system, different than the first wireless cellular system and the second wireless cellular system, that permits the first service to coexist with the second service; and
   clearing the suspension.

2. The method of claim 1, further comprising:
   commencing the second service selection on the mobile terminal,
   the first service using the third wireless cellular system coexisting with the second service using the second wireless cellular system.

3. The method of claim 2, wherein clearing the suspension includes:
   clearing the suspension of the data transport using the first service selection on the mobile terminal after completion of the second service selection.

4. The method of claim 3, wherein the first wireless cellular system is based on a LTE system.

5. The method of claim 4, wherein the second wireless cellular system is based on a forward link only wireless broadcast system.

6. The method of claim 3, wherein the suspension includes:

clearing the identifier for the mobile terminal or is performed by a mobile terminal scheduler that indicates not to use the first wireless cellular system.

7. The method of claim 1, wherein the identifier is a Class Mark identifier.

8. The method of claim 1, wherein the suspension of the data transport is implemented by a mobile terminal scheduler.

9. The method of claim 1, wherein the third wireless cellular system is based on one of the following: 1x-EVDO, UMTS or GSM.

10. The method of claim 1, wherein the channel of the second wireless cellular system used by the second service interferes with the channel of the first wireless cellular system used by the first service due to at least one of a shared radio band or an adjacent channel interference.

11. An apparatus comprising a processor and a memory, the memory containing program code executable by the processor to:
accept a first service selection for a first wireless cellular system on a mobile terminal;
perform a data transport using the first service selection on the mobile terminal;
accept a second service selection for a second wireless cellular system on the mobile terminal, wherein a channel of the second wireless cellular system used by a second service interferes with a channel of the first wireless cellular system used by a first service;
implement a suspension of the data transport using the first service selection on the mobile terminal based on the second service selection being accepted,
the suspension of the data transport being implemented by the mobile terminal setting an identifier for the mobile terminal that indicates not to use the first wireless cellular system;
cause the data transport to be redirected using a third wireless cellular system, different than the first wireless cellular system and the second wireless cellular system, that permits the first service to coexist with the second service; and
clear the suspension.

12. The apparatus of claim 11, wherein the memory further comprises program code that causes the processor to commence the second service selection on the mobile terminal.

13. The apparatus of claim 12, wherein the memory further comprises program code that causes the processor to clear the suspension of the data transport using the first service selection on the mobile terminal after completion of the second service selection.

14. The apparatus of claim 13, wherein the first wireless cellular system is based on a LTE system.

15. The apparatus of claim 14, wherein the second wireless cellular system is based on a forward link only wireless broadcast system.

16. The apparatus of claim 13, wherein the processor, when clearing the suspension, is to:
clear the identifier for the mobile terminal that indicates not to use the first wireless cellular system.

17. The apparatus of claim 11, wherein the identifier is a Class Mark identifier.

18. The apparatus of claim 11, wherein the suspension of the data transport is implemented by a mobile terminal scheduler.

19. The apparatus of claim 11, wherein the third wireless cellular system is based on one of the following: 1x-EVDO, UMTS or GSM.

20. An apparatus for implementing a system solution for coexistence between a first service and a second service comprising:
means for accepting a first service selection for a first wireless cellular system on a mobile terminal;
means for performing a data transport using the first service selection on the mobile terminal;
means for accepting a second service selection for a second wireless cellular system on the mobile terminal, wherein a channel of the second wireless cellular system used by the second service interferes with a channel of the first wireless cellular system used by the first service;
means for implementing a suspension of the data transport using the first service selection on the mobile terminal based on accepting the second service selection,
the suspension of the data transport being implemented by the mobile terminal setting an identifier for the mobile terminal that indicates not to use the first wireless cellular system;
means for causing the data transport to be redirected using a third wireless cellular system, different than the first wireless cellular system and the second wireless cellular system, that permits the first service to coexist with the second service; and
means for clearing the suspension.

21. The apparatus of claim 20, further comprising:
means for commencing the second service selection on the mobile terminal.

22. The apparatus of claim 21, wherein the means for clearing the suspension of the data transport include means for using the first service selection on the mobile terminal after completion of the second service selection.

23. The apparatus of claim 22, wherein the first wireless cellular system is based on a LTE system.

24. The apparatus of claim 23, wherein the second wireless cellular system is based on a forward link only wireless broadcast system.

25. The apparatus of claim 22, wherein the means for clearing of the suspension includes means for clearing the identifier for the mobile terminal that indicates not to use the first wireless cellular system.

26. The apparatus of claim 20, wherein the identifier is a Class Mark identifier.

27. The apparatus of claim 20, wherein the suspension of the data transport is implemented by a mobile terminal scheduler.

28. The apparatus of claim 20, wherein the third wireless cellular system is based on one of the following: 1x-EVDO, UMTS or GSM.

29. A non-transitory computer-readable medium storing instructions, the instructions comprising:
one or more instructions that, when executed by one or more processors, cause the one or more processors to:
accept a first service selection for a first wireless cellular system on a mobile terminal;
perform a data transport using the first service selection on the mobile terminal;
accept a second service selection for a second wireless cellular system on the mobile terminal, wherein a channel of the second wireless cellular system used by a second service interferes with a channel of the first wireless cellular system used by a first service;
implementing implement a suspension of the data transport using the first service selection on the mobile terminal based on the second service selection being accepted, the suspension of the data transport being implemented by the mobile terminal setting an identifier for the mobile terminal that indicates not to use the first wireless cellular system;

cause the data transport to be redirected using a third wireless cellular system, different than the first wireless cellular system and the second wireless cellular system, that permits the first service to coexist with the second service; and clear the suspension.

30. The non-transitory computer-readable medium of claim 29, wherein the one or more instructions further cause the one or more processors to:

commence the second service selection on the mobile terminal.

31. The non-transitory computer-readable medium of claim 30, wherein the one or more instructions, when clearing the suspension of the data transport, cause the one or more processors to:

clear the suspension of the data transport using the first service selection on the mobile terminal after completion of the second service selection.

32. The non-transitory computer-readable medium of claim 29, wherein the first wireless cellular system is based on a LTE system.

33. The non-transitory computer-readable medium of claim 29, wherein the one or more instructions, when clearing the suspension of the data transport, cause the one or more processors to:

clear the identifier.

34. The non-transitory computer-readable medium of claim 29, wherein the channel of the second wireless cellular system used by the second service interferes with the channel of the first wireless cellular system used by the first service due to at least one of a shared radio band or an adjacent channel interference.

* * * * *